US012722216B2

(12) United States Patent
Goto et al.

(10) Patent No.: US 12,722,216 B2
(45) Date of Patent: Sep. 1, 2026

(54) CUTTING INSERT, ROTARY TOOL, AND METHOD FOR MANUFACTURING MACHINED PRODUCT

(71) Applicant: KYOCERA CORPORATION, Kyoto (JP)

(72) Inventors: Shosei Goto, Kyoto (JP); Tsuneaki Ishizu, Kyoto (JP); Daichi Inoue, Kyoto (JP); Yuusuke Chiba, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 307 days.

(21) Appl. No.: 18/710,613

(22) PCT Filed: Nov. 10, 2022

(86) PCT No.: PCT/JP2022/041890
§ 371 (c)(1),
(2) Date: May 16, 2024

(87) PCT Pub. No.: WO2023/090246
PCT Pub. Date: May 25, 2023

(65) Prior Publication Data

US 2025/0010384 A1 Jan. 9, 2025

(30) Foreign Application Priority Data

Nov. 17, 2021 (JP) ................................ 2021-187311

(51) Int. Cl.
*B23C 5/20* (2006.01)
*B23C 3/00* (2006.01)
(Continued)

(52) U.S. Cl.
CPC .................. *B23C 5/20* (2013.01); *B23C 5/18* (2013.01); *B23C 3/00* (2013.01); *B23C 5/06* (2013.01);
(Continued)

(58) Field of Classification Search
CPC ......... Y10T 407/1932; Y10T 407/1944; Y10T 407/26; B23C 5/2226; B23C 5/2252;
(Continued)

(56) References Cited

U.S. PATENT DOCUMENTS 5,529,439 A 6/1996 Werner et al.
5,957,628 A * 9/1999 Bentjens ............... B23C 5/2472 407/38
6,280,122 B1 * 8/2001 Qvarth .................. B23C 5/2479 407/46
6,334,740 B1 1/2002 Qvarth
(Continued)

FOREIGN PATENT DOCUMENTS

JP H08509430 A 10/1996
JP 2000135619 A 5/2000
(Continued)

*Primary Examiner* — Erica E Cadugan
(74) *Attorney, Agent, or Firm* — HAUPTMAN HAM, LLP

(57) ABSTRACT

A cutting insert of a rotary tool includes a base portion and a cutting portion. The base portion includes a first rear surface and a first end surface having a first region and second region. The cutting portion includes a second front surface and a second rear surface. The first region is located rearward of the second rear surface and to an outer side. The second region is located rearward of the second front surface and to an inner side. A virtual plane including the second rear surface is a reference plane. The first region includes a portion in which a width of a region interposed between the reference plane and the first rear surface increases toward the outer side, and the second region includes a portion in which a width of a region interposed between the reference plane and the first rear surface increases toward the inner side.

10 Claims, 12 Drawing Sheets

(51) Int. Cl.
*B23C 5/18* (2006.01)
*B23C 5/06* (2006.01)
*B23C 5/22* (2006.01)

(52) U.S. Cl.
CPC ...... *B23C 5/2226* (2013.01); *B23C 2210/168* (2013.01); *B23C 2220/08* (2013.01); *B23C 2240/08* (2013.01); *Y10T 407/1932* (2015.01); *Y10T 407/1944* (2015.01); *Y10T 407/26* (2015.01); *Y10T 409/303752* (2015.01)

(58) Field of Classification Search
CPC ....... B23C 5/2278; B23C 5/2306; B23C 5/18; B23C 2240/08; B23C 2240/16; B23C 2240/21
USPC ...................... 407/46, 52, 118; 409/131–132
See application file for complete search history.

(56) References Cited

U.S. PATENT DOCUMENTS

2004/0208713 A1 10/2004 Duerr et al.
2015/0266112 A1* 9/2015 Morrison .............. B23C 5/2273 407/108
2017/0036279 A1 2/2017 Yamamoto
2019/0351493 A1* 11/2019 Kinoshita ................. B23C 5/24
2020/0398354 A1* 12/2020 Yamamoto ............ B23B 27/145

FOREIGN PATENT DOCUMENTS

JP 2002011612 A 1/2002
JP 2008023632 A 2/2008
JP 2023-094207 A * 7/2023
WO 2015163436 A1 10/2015

* cited by examiner

CUTTING INSERT, ROTARY TOOL, AND METHOD FOR MANUFACTURING MACHINED PRODUCT

RELATED APPLICATIONS

The present application is a National Phase of International Application No. PCT/JP2022/041890 filed Nov. 10, 2022, which claims priority to Japanese Application No. 2021-187311, filed Nov. 17, 2021.

TECHNICAL FIELD

The present disclosure relates to a cutting insert used for milling processing of a workpiece, a rotary tool, and a method for manufacturing a machined product.

BACKGROUND OF INVENTION

Examples of known rotary tools to be used in milling processing of a workpiece made of a metal material or the like include rotary tools described in Patent Documents 1 to 3. The rotary tools respectively described in Patent Documents 1 to 3 include a holder, and a cutting insert held by the holder. The cutting insert in the rotary tool described in Patent Document 3 has a base portion referred to as a cartridge in Patent Document 3, and a cutting portion referred to as a cutting edge tip in Patent Document 3.

CITATION LIST

Patent Literature

Patent Document 1: JP 2004-284010 A
Patent Document 2: JP 2008-023632 A
Patent Document 3: JP 2002-011612 A

SUMMARY

A cutting insert according to the present disclosure is a cutting insert used in a rotary tool rotatable about a rotation axis, and includes a base portion and a cutting portion. The base portion includes a first rear surface located rearward in a rotation direction of the rotary tool, a first front surface located on an outer side in a radial direction and facing forward in the rotation direction, and a first end surface located on a front end side in a direction along the rotation axis, and connected to the first rear surface and the first front surface. The cutting portion includes a flat second rear surface bonded to the first front surface, a flat second front surface located opposite to the second rear surface, a second end surface located on the front end side and connected to the second rear surface and the second front surface, and a cutting edge located at an intersection of the second front surface and the second end surface. The first end surface includes a first region located, when viewed from the front end side, rearward of the second rear surface in the rotation direction and to the outer side of the second rear surface in the radial direction, and a second region located rearward of the second front surface in the rotation direction and further to an inner side in the radial direction than the first region. When a virtual plane including the second rear surface is a reference plane, the first region has a first portion in which a width of a region interposed between the reference plane and the first rear surface gradually increases toward the outer side in the radial direction. The second region has a second portion in which a width of a region interposed between the reference plane and the first rear surface gradually increases toward the inner side in the radial direction.

DESCRIPTION OF EMBODIMENTS

Figure 1:
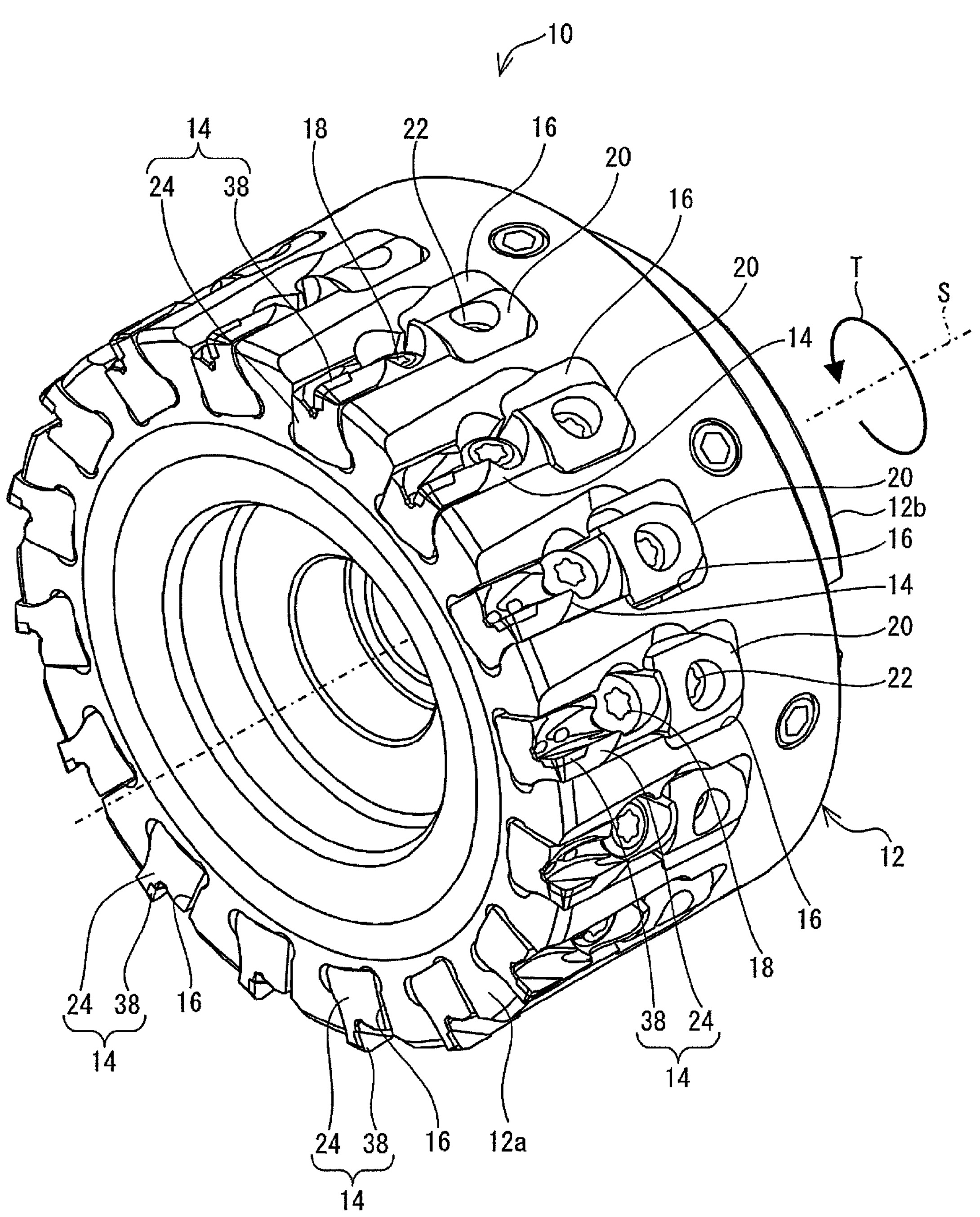
FIG. 1 is a schematic perspective view of a rotary tool according to an embodiment of the present disclosure.

A cutting insert, a cutting tool, and a method for manufacturing a machined product according to an embodiment of the present disclosure will be described below in detail with reference to the drawings. However, each of the figures, which will be referred to below, is a simplified representation of only components necessary for description of the embodiments, for convenience of description. Accordingly, the cutting insert and the rotary tool according to an embodiment of the present disclosure may be provided with an optional component that is not illustrated in the referenced figures. The dimensions of the components in the drawings do not faithfully represent the actual dimensions of the components, the dimension ratios of the members, or the like.

According to the present disclosure, a rotation axis refers to a rotation axis (rotation axis center) of the rotary tool. A radially outer side is a direction away from or a side away from the rotation axis in a radial direction, and is synonymous with an outer peripheral side. A radially inner side is a direction near to or a side near to the rotation axis in the radial direction. The radial direction is a direction orthogonal to the rotation axis. The term "orthogonal" is not limited to being strictly orthogonal and means that an error of approximately ±5 degrees is allowed. The term "parallel" is not limited to being strictly parallel and means that an error of about ±5 degrees is allowed. In the present disclosure, for the sake of convenience, positional relationships between portions and the like of the cutting insert are defined on the basis of a state in which the cutting insert is held (fixed) in a pocket of a holder.

Rotary Tool

A rotary tool 10 according to the embodiment of the present disclosure will be described with reference to FIGS.

Figure 2:
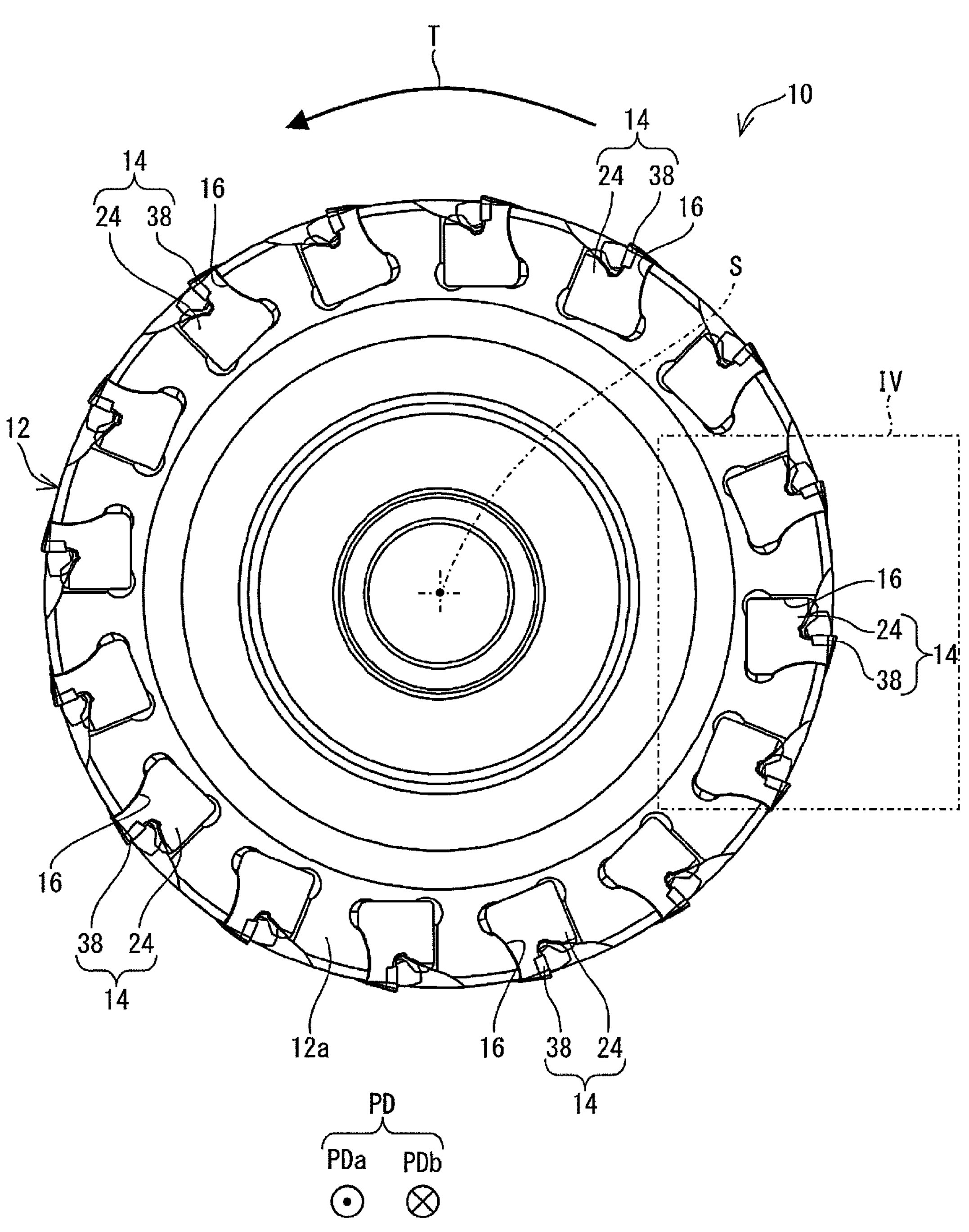
FIG. 2 is a schematic view of the rotary tool illustrated in FIG. 1, as viewed from a front end side of the rotary tool.
Figure 3:
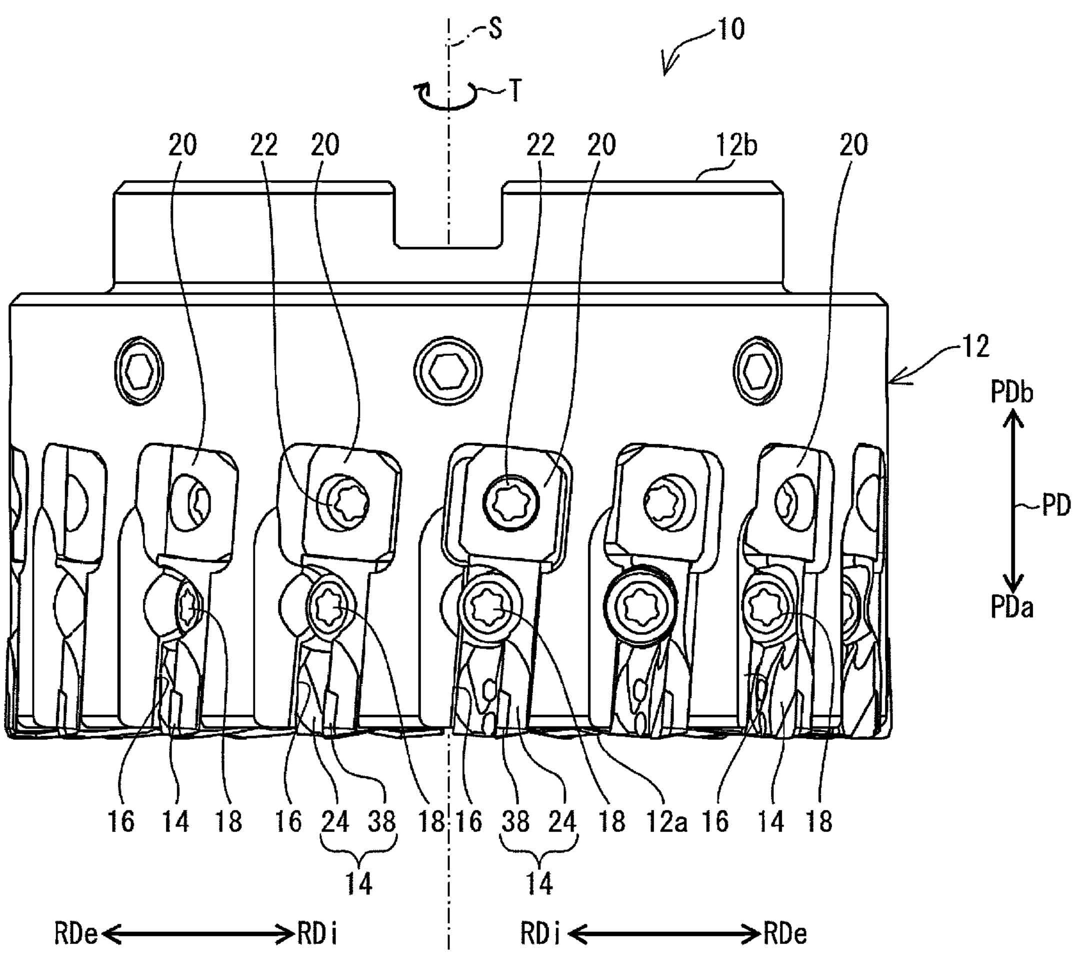
FIG. 3 is a schematic side view of the rotary tool illustrated in FIG. 1.
Figure 4:
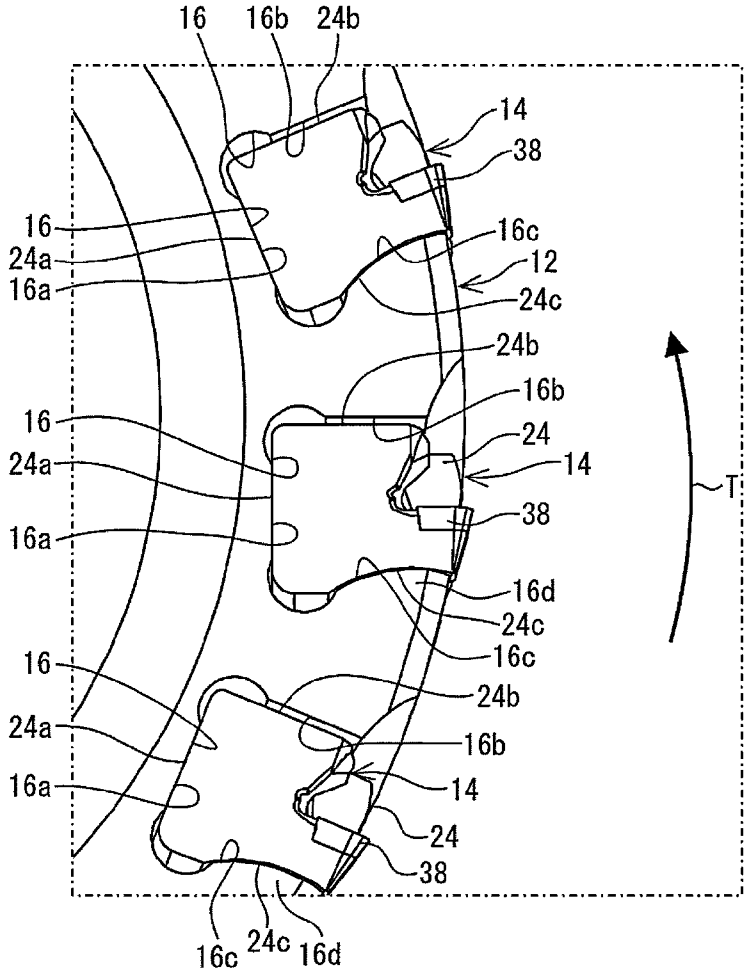
FIG. 4 is an enlarged view of a part IV in FIG. 2.

1 to 4. FIG. 1 is a schematic perspective view of the rotary tool 10 according to the embodiment of the present disclosure. FIG. 2 is a schematic view of the rotary tool 10 illustrated in FIG. 1, as viewed from a front end side of the rotary tool. FIG. 3 is a schematic side view of the rotary tool illustrated in FIG. 1. FIG. 4 is an enlarged view of a part IV in FIG. 2.

As illustrated in the example in FIGS. 1 to 3, the rotary tool 10 according to the embodiment of the present disclosure is a tool used for milling processing of a workpiece W (see FIG. 10), and is rotatable about a rotation axis S. The rotary tool 10 may include a holder 12 attached to a spindle of a processing machine such as a milling machine, and a plurality of cutting inserts 14 held by the holder 12. The holder 12 and the cutting inserts 14 are used in the rotary tool 10.

The holder 12 may have a circular cylindrical shape extending from a front end 12*a* to a rear end 12*b* along the rotation axis S. Examples of the material of the holder 12 include metals, such as stainless steel, carbon steel, cast iron, and an aluminum alloy. A plurality of pockets 16 may be provided at intervals in a peripheral direction on the outer peripheral surface of the holder 12. The plurality of pockets 16 may be arranged at equal intervals in the peripheral direction or at unequal intervals in the peripheral direction. The plurality of pockets 16 may be located on a side of the front end 12*a* of the holder 12. The number of the pockets 16 may be one.

As in the example illustrated in FIGS. 3 and 4, a front end PDa of the pocket 16 in a direction PD parallel to the rotation axis S may be open. A radially outer side RDe of the pocket 16 may be open. The pocket 16 may have a bottom surface 16*a* located on a radially inner side RDi, and a first inner side surface 16*b* and a second inner side surface 16*c* rising from both sides of the bottom surface 16*a* toward a radially outer side RDo. The first inner side surface 16*b* of each of the pockets 16 may be located forward in a rotation direction T, in other words, on a side in the rotation direction T. The second inner side surface 16*c* of each of the pockets 16 may be located rearward in the rotation direction T, in other words, on a side opposite to the rotation direction T. The second inner side surface 16*c* of each of the pockets 16 may have a curved shape (convex shape) protruding forward in the rotation direction T. In other words, the second inner side surface 16*c* of each of the pockets 16 may have a protrusion 16*d* that protrudes forward in the rotation direction T.

As in the example shown in FIGS. 1 to 3, the cutting insert 14 may be located in each of the pockets 16 of the holder 12. The cutting insert 14 may be located only in a selected one or more of the pockets 16 in the holder 12. The cutting insert 14 may be fixed to the pocket 16 of the holder 12 by a fixing screw 18. The cutting insert 14 may be fixed to the pocket 16 of the holder 12 by a clamp member.

The rotary tool 10 may include an adjustment mechanism 20 for adjusting a position of the cutting insert 14 relative to the pocket 16 of the holder 12. The adjustment mechanism 20 may be located at a position adjacent to the cutting insert 14 in the pocket 16 of the holder 12. The adjustment mechanism 20 may be fixed to the pocket 16 of the holder 12 by a fixing screw 22.

Cutting Insert

Figure 5:
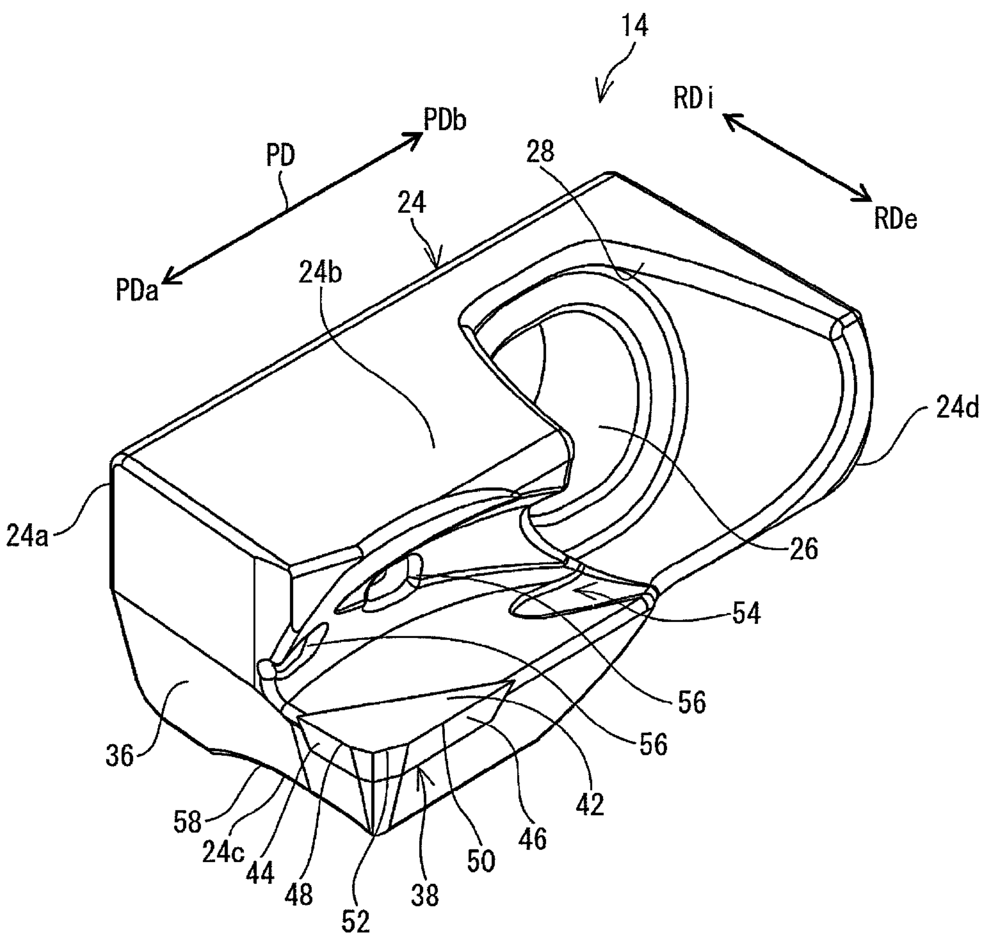
FIG. 5 is a schematic perspective view of a cutting insert according to the embodiment of the present disclosure.
Figure 6:
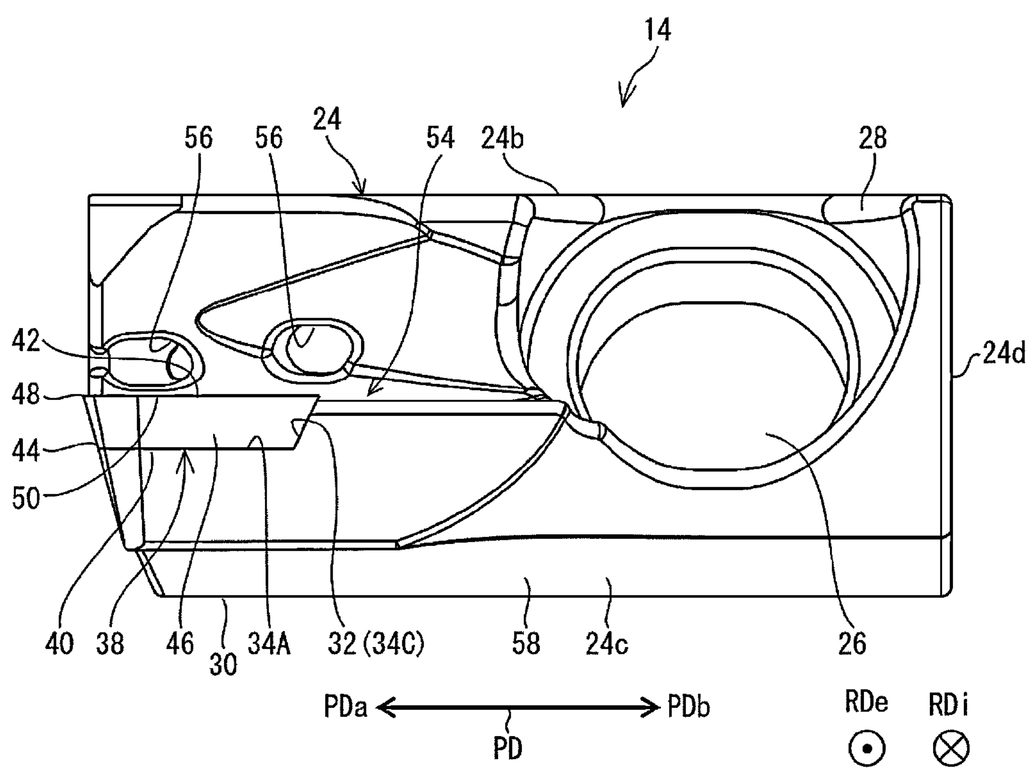
FIG. 6 is a schematic plan view of the cutting insert illustrated in FIG. 5.
Figure 7:
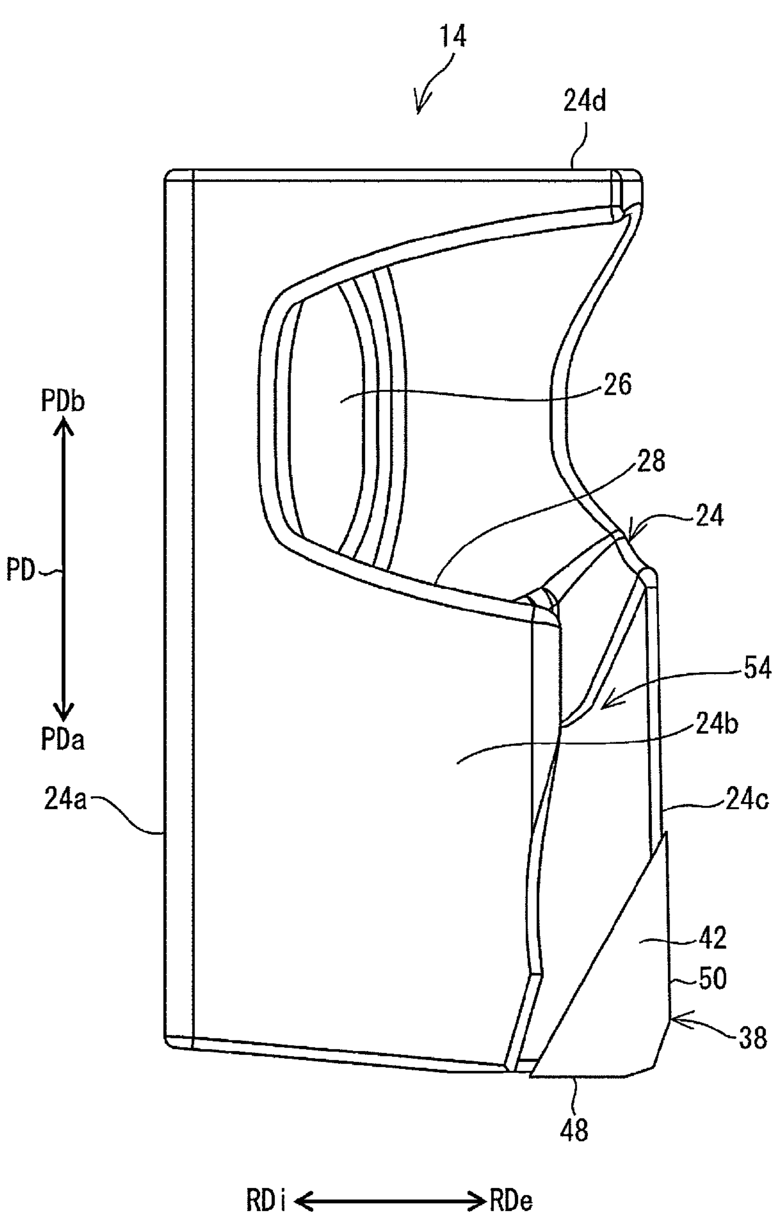
FIG. 7 is a schematic plan view of the cutting insert illustrated in FIG. 5.
Figure 8:
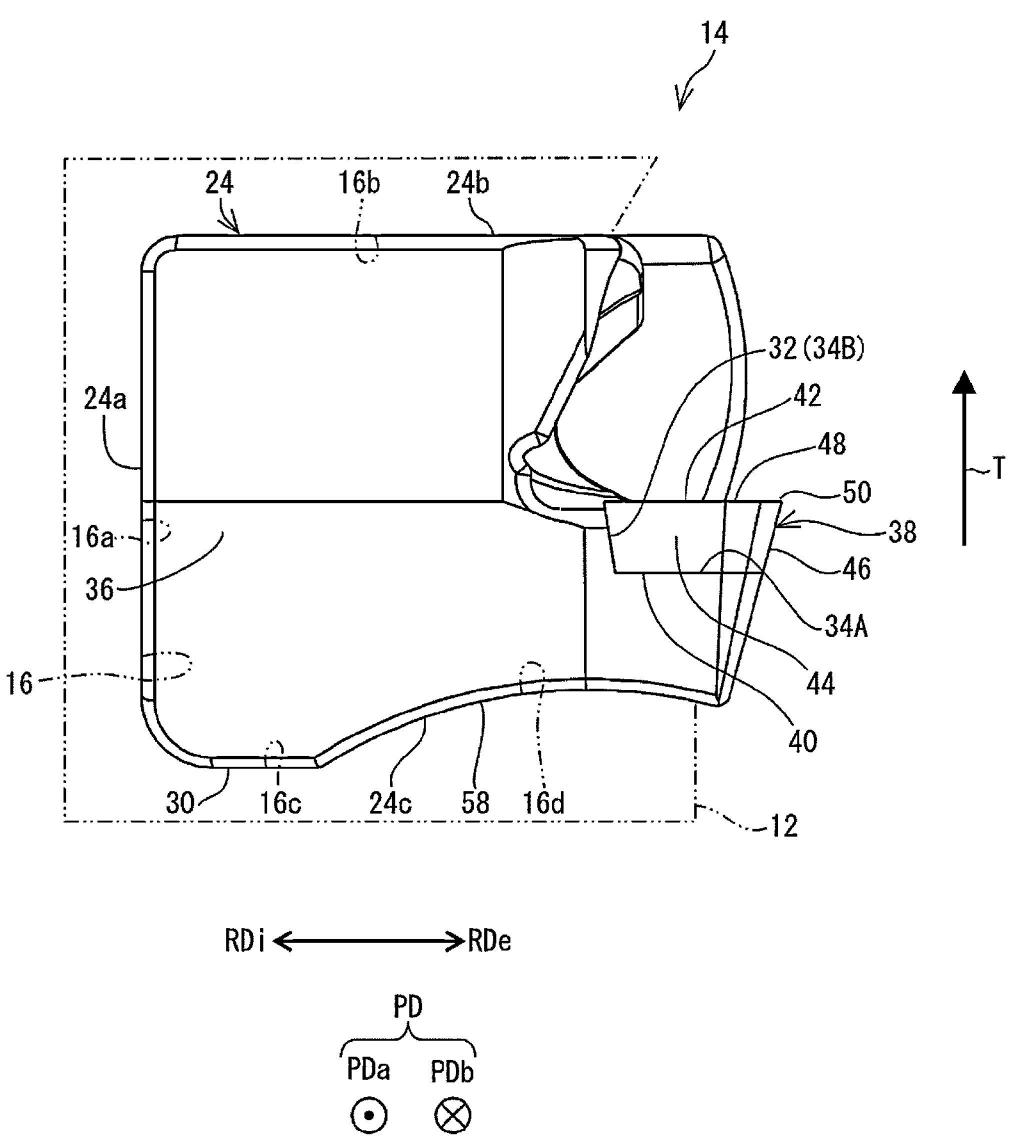
FIG. 8 is a schematic plan view of the cutting insert illustrated in FIG. 5.

A configuration of the cutting insert 14 according to the embodiment of the present disclosure will be described with reference to FIGS. 5 to 8. FIG. 5 is a schematic perspective view of the cutting insert 14 according to the embodiment of the present disclosure. Each of FIGS. 6 to 8 is a schematic plan view of the cutting insert 14 illustrated in FIG. 5. FIG. 6 is a plan view (side view) viewed in a direction from the radially outer side RDe toward the rotation axis S. FIG. 7 is a plan view of the cutting insert 14 illustrated in FIG. 5, as viewed from the forward direction in the rotation direction T. FIG. 8 is a plan view (side view) of the cutting insert 14 illustrated in FIG. 5, as viewed from the front end along the rotation axis S.

As in the example illustrated in FIGS. 5 to 8, the cutting insert 14 according to the embodiment of the present disclosure may have a base portion 24 for mounting the cutting insert 14 in the pocket 16 of the holder 12. The base portion 24 may have a recess that is open toward the radially outer side RDe and toward the front end PDa in the direction PD parallel to the rotation axis S. The base portion 24 may have a main wall portion 24*a* that can abut against the bottom surface 16*a* of the pocket 16 of the holder 12.

The base portion 24 may have a first outer wall portion 24*b* facing the first inner side surface 16*b* of the pocket 16 of the holder 12. The first outer wall portion 24*b* of the base portion 24 may extend from the main wall portion 24*a* toward the radially outer side RDe. The base portion 24 may have a second outer wall portion 24*c* that can abut against the second inner side surface 16*c* of the pocket 16 of the holder 12. The second outer wall portion 24*c* of the base portion 24 may extend radially outward from the main wall portion 24*a*. The second outer wall portion 24*c* of the base portion 24 may be located rearward of the first outer wall portion 24*b* in the rotation direction T. The base portion 24 may have a rising wall portion 24*d* rising from the second outer wall portion 24*c* to the first outer wall portion 24*b* on the side of the rear end PDb in the direction PD parallel to the rotation axis S.

Each of the main wall portion 24*a*, the first outer wall portion 24*b*, the second outer wall portion 24*c*, and the rising wall 24*d* is a component of an outer edge surface of the base portion 24 and has a thickness.

The base portion 24 may have a through hole 26 through which the fixing screw 18 is inserted. The through hole 26 may be open to the radially inner side RDi and the radially outer side RDe. The opening of the through hole 26 on the radially inner side RDi may be located in the wall surface of the main wall portion 24*a*. The first outer wall portion 24*b* of the base portion 24 may have a cutout portion 28 for avoiding interference with the fixing screw 18.

As in the example illustrated in FIG. 8, the base portion 24 may have a first rear surface 30 located rearward in the rotation direction T, and most of the first rear surface 30 may be constituted by the outer surface of the second outer wall portion 24*c* of the base portion 24. The first rear surface 30 of the base portion 24 may extend from the front end PDa side to the rear end PDb side in the direction PD parallel to the rotation axis S. The direction PD parallel to the rotation axis S is an example of a direction along the rotation axis S.

The base portion 24 may be provided with a recess 32 that is open forward in the rotation direction T and toward the radially outer side RDe. The recess 32 may be located on the side of the front end PDa in the direction PD parallel to the rotation axis S and on the radially outer side RDe of the base portion 24. The bottom surface of the recess 32 may be a first front surface 34A facing forward in the rotation direction T. In other words, the base portion 24 may have the first front surface 34A facing forward in the rotation direction T. The first front surface 34A of the base portion 24 may be located on the side of the front end PDa in the direction PD parallel to the rotation axis S and on the radially outer side RDe of the base portion 24.

The base portion 24 may have a first end surface 36 located on the side of the front end PDa in the direction PD parallel to the rotation axis S. The first end surface 36 may be constituted by end surfaces of the main wall portion 24*a*, the first outer wall portion 24*b*, and the second outer wall portion 24*c* on the side of the front end PDa in the direction PD parallel to the rotation axis S. The first end surface 36 of the base portion 24 may be connected to the first rear surface 30 and the first front surface 34A.

Examples of the material of the base portion 24 include stainless steel, carbon steel, or tool steel, for example.

The cutting insert 14 may have a cutting portion 38 that comes into contact with the workpiece W to perform machining. The cut portion 38 may be bonded to the first front surface 34A, which is the bottom surface of the recess 32 of the base portion 24, by a bonding material such as a brazing material. The recess 32 may have a lateral wall surface 34B located on the radially inner side RDi of the first front surface 34A, and the cutting portion 38 may be bonded to the lateral wall surface 34B in addition to the first front surface 34A. The recess 32 may have a rear wall surface 34C located on the side of the rear end PDb in the direction PD parallel to the rotation axis S with respect to the first front surface 34A, and the cutting portion 38 may be bonded to the rear wall surface 34C in addition to the first front surface 34A and the lateral wall surface 34B. The cutting portion 38 may have a substantially polygonal plate shape, such as a substantially triangular plate shape or the like.

As in the example shown in FIGS. 5 to 8, the cutting portion 38 may have a flat second rear surface 40 bonded to the first front surface 34A of the base portion 24. The second rear surface 40 of the cutting portion 38 may face rearward in the rotation direction T. In other words, the second rear surface 40 of the cutting portion 38 may be located rearward of the cutting portion 38 in the rotation direction T. The cutting portion 38 may also have a flat second front surface 42 located opposite to the second rear surface 40. The second front surface 42 of the cutting portion 38 may face forward in the rotation direction T. In other words, the second front surface 42 of the cutting portion 38 may be located forward of the cutting portion 38 in the rotation direction T.

The cutting portion 38 may have a second end surface 44 located on the side of the front end PDa in the direction PD parallel to the rotation axis S. The second end surface 44 of the cutting portion 38 may be connected to the second rear surface 40 and the second front surface 42. The cutting portion 38 may have an outer surface 46 located on the radially outer side RDe. The outer surface 46 of the cutting portion 38 may be connected to the second rear surface 40 and the second front surface 42.

The cutting portion 38 may have an end cutting edge 48 as a first cutting edge located at an intersection of the second front surface 42 and the second end surface 44. The cutting portion 38 may have an outer peripheral blade 50 as a second cutting edge located at an intersection of the second front surface 42 and the outer surface 46. The end cutting edge 48 and the outer peripheral blade 50 may be connected to each other via a corner portion 52. The corner portion 52 of the cutting portion 38 may function as a corner blade.

Examples of the material of the cutting portion 38 may include hard materials, such as cubic boron nitride (cBN), and polycrystalline diamond (PCD). The surface of the cutting portion 38 may be coated with a coating film using a chemical vapor deposition (CVD) method or a physical vapor deposition (PVD) method. Examples of the material of the coating film include titanium carbide (TiC), titanium nitride (TiN), titanium carbonitride (TiCN), or alumina ($Al_2O_3$), for example.

As in the example illustrated in FIGS. 5 to 8, the base portion 24 may be provided with a chip pocket 54 for discharging chips. The recess 32 may be located inside the chip pocket 54. The chip pocket 54 may be located forward of the cutting portion 38 in the rotation direction T. The base portion 24 may be provided with an injection hole 56 for injecting a coolant (cooling medium) toward the cutting portion 38. The number of the injection holes 56 may be one or more. The injection hole 56 may be connected to a coolant supply source via a coolant passage provided inside the holder 12.

Figure 9:
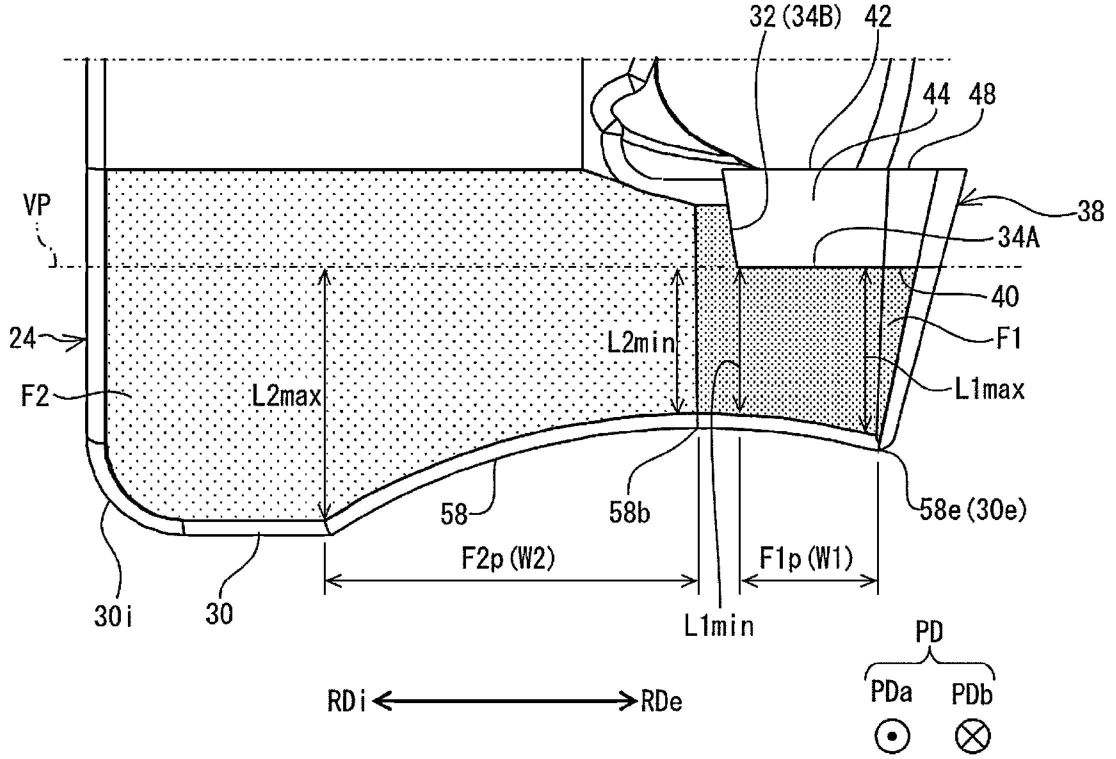
FIG. 9 is a schematic enlarged view of a part of the cutting insert illustrated in FIG. 8.

A remaining configuration of the cutting insert 14 according to the embodiment of the present disclosure will be described with reference to FIGS. 6, 8, and 9. FIG. 9 is a schematic enlarged view of a part of the cutting insert 14 illustrated in FIG. 8.

As in the example illustrated in FIGS. 8 and 9, the first end surface 36 of the base portion 24 has a first region F1. When viewed from the front end PDa in the direction PD parallel to the rotation axis S (see FIG. 1), the first region F1 may include a portion located rearward of the second rear surface 40 of the cutting portion 38 in the rotation direction T, and may be located on the radially outer side RDe of the base portion 24. When viewed from the front end PDa in the direction PD parallel to the rotation axis S, the first end surface 36 of the base portion 24 may have a second region F2 located rearward of the second front surface 42 of the cutting portion 38 in the rotation direction T and located further to the radially inner side RDi than the first region F1. In the example illustrated in FIG. 9, the first region F1 and the second region F2 of the first end surface 36 of the base portion 24 are indicated by different dots.

When a virtual plane including the second rear surface 40 of the cutting portion 38 is a reference plane VP, the first region F1 of the first end surface 36 of the base portion 24 may have a first portion F1*p* which is located rearward of the second rear surface 40 of the cutting portion 38 in the rotation direction T, and in which a width of a region interposed between the reference plane VP and the first rear surface 30 gradually increases toward the radially outer side RDe. The second region F2 of the first end surface 36 of the base portion 24 may have a second portion F2*p* in which a width of a region interposed between the reference plane VP and the first rear surface 30 gradually increases toward the radially inner side RDi. The width of the region interposed between the reference plane VP and the first rear surface 30 is the width in a direction orthogonal to the reference plane VP.

The first region F1 may have a portion other than the first portion F1*p*. For example, the first region F1 may have a portion having a constant width, in addition to the first portion F1*p* whose width gradually increases toward the radially outer side RDe. The portion having the constant width may be located on the radially inner side RDi or on the radially outer side RDe with respect to the first portion F1*p*.

The second region F2 may have a portion other than the second portion F2*p*. For example, the second region F2 may include a portion having a constant width, in addition to the second portion F2*p* whose width gradually increases toward the radially outer side RDe. The portion having the constant width may be located on the radially inner side RDi or on the radially outer side RDe with respect to the second portion F2*p*. For example, as illustrated in FIG. 9, when the portion having the constant width is located on the radially inner side RDi with respect to the second portion F2$p$, the thickness of the portion of the holder 12 that supports the cutting insert 14 is easily secured.

A maximum value L1max of the width of the region interposed between the reference plane VP and the first rear surface 30 in the first region F1 of the first end surface 36 of the base portion 24 may be less than a maximum value L2max of the width of the region interposed between the reference plane VP and the first rear surface 30 in the second region F2. A minimum value L1min of the width of the region interposed between the reference plane VP and the first rear surface 30 in the first region F1 of the first end surface 36 of the base portion 24 may be greater than a minimum value L2min of the width of the region interposed between the reference plane VP and the first rear surface 30 in the second region F2.

As in the example illustrated in FIGS. 6, 8, and 9, the first end surface 36 of the base portion 24 may have a groove 58 extending in the direction along the rotation axis S. The groove 58 of the base portion 24 may extend in the direction PD parallel to the rotation axis S. The groove 58 of the base portion 24 may have a curved shape (concave shape) recessed forward in the rotation direction T. In other words, the first end surface 36 of the base portion 24 may have the groove 58 as a recess recessed forward in the rotation direction T. The groove 58 of the base portion 24 may be engageable with the protrusion 16*d* of the pocket 16 of the holder 12.

The groove 58 of the base portion 24 may have a bottom portion 58*b* located most frontward in the rotation direction T. The bottom portion 58*b* of the groove 58 of the base portion 24 may be located on the radially inner side RDi with respect to the cutting portion 38. An edge portion 58*e* on the radially outer side RDe of the groove 58 of the base portion 24 may coincide with an edge portion 30*e* on the radially outer side RDe of the first rear surface 30. The groove 58 of the base portion 24 may be spaced apart from an edge portion 30*i* on the radially inner side RDi of the first rear surface 30.

When the first region F1 of the first end surface 36 of the base portion 24 has the first portion F1*p* as in the example illustrated in FIG. 9, the base portion 24 can be sufficiently thick on the radially outer side RDe (outer peripheral side). Thus, even when a great machining load is applied to the outer peripheral side of the base portion 24, the base portion 24 is less likely to be damaged. Thus, the durability of the base portion 24 can be enhanced, and cutting conditions of a high rotation speed can be set.

As in the example illustrated in FIGS. 8 and 9, when the first region F1 of the first end surface 36 of the base portion 24 has the first portion F1*p*, the durability of the base portion 24 with respect to the machining load is improved. When the second region F2 of the first end surface 36 of the base portion 24 has the second portion F2*p*, the second portion F2*p* can reduce scattering of the cutting insert 14 caused by centrifugal force, even at the high rotation speed. When the base portion 24 includes both the first portion F1*p* and the second portion F2*p*, the first rear surface 30 of the base portion 24 has a concave shape recessed forward in the rotation direction T. Thus, the number of the pockets 16 to which the cutting inserts 14 are attached can be increased, while ensuring the durability of the portion of the holder 12 located rearward of the cutting insert 14 in the rotation direction and the durability of the base portion 24. Therefore, machining can be performed with higher efficiency.

Since the first rear surface 30 of the base portion 24 has the concave shape recessed forward in the rotation direction T, the position of the cutting insert 14 is less likely to be displaced with respect to the holder 12, and machining accuracy of the cutting insert 14 can be improved.

As described above, the first region F1 is the portion, of the first end surface 36, located rearward of the second rear surface 40 in the rotation direction T, and the second region F2 is the portion, of the first end surface 36, adjacent to the first region F1 on the radially inner side RDi. In particular, in the example illustrated in FIG. 9, taking the bottom portion 58*b* of the groove 58 as a reference, the first region F1 is the portion located further to the radially outer side RDe than the bottom portion 58*b* of the groove 58 in the first end surface 36, and the second region F2 is the portion located further to the radially inner side RDi than the bottom portion 58*b* of the groove 58 in the first end surface 36. In other words, the bottom portion 58*b* of the groove 58 is located at a boundary between the first region F1 and the second region F2.

As in the example illustrated in FIGS. 8 and 9, it is assumed that the maximum value L1max of the width of the first portion F1*p* in the first region F1 of the first end surface 36 of the base portion 24 is less than the maximum value L2max of the width of the second portion F2*p* in the second region F2. In this case, the thickness of the portion of the holder 12 that supports the cutting insert 14 on the outer peripheral side (radially outer side RDe) can sufficiently be secured. Thus, the holder 12 is less likely to be damaged, and the durability of the holder 12 can be further improved.

As in the example illustrated in FIGS. 8 and 9, it is assumed that the minimum value L1min of the width of the first portion F1*p* in the first region F1 of the first end surface 36 of the base portion 24 is greater than the minimum value L2min of the width of the second portion F2*p* in the second region F2. In this case, the thickness of the portion supporting the cutting portion 38 can sufficiently be secured in the base portion 24 on the outer peripheral side. The thickness on the outer peripheral side of the holder 12 can be sufficiently secured. Thus, the holder 12 is less likely to be damaged, and the durability of the holder 12 can be further improved.

As in the example illustrated in FIGS. 6, 8, and 9, when the groove 58 of the base portion 24 has the curved shape (concave shape) recessed forward in the rotation direction T, the machining load is less likely to be concentrated at specific portions of the first rear surface 30 of the base portion 24 and the first inner side surface 16*b* serving as a bearing surface of the holder 12. Thus, the cutting insert 14 and the holder 12 are less likely to be damaged, and the durability of the cutting insert 14 and the holder 12 can be further improved.

As in the example illustrated in FIGS. 8 and 9, when the bottom portion 58*b* of the groove 58 of the base portion 24 is located further to the radially inner side RDi than the cutting portion 38, a machining load is less likely to be applied to a portion corresponding to the bottom portion 58*b*, which is a thin portion of the base portion 24. Thus, the cutting insert 14 is even less likely to be damaged, and the durability of the cutting insert 14 can be even further enhanced.

As in the example illustrated in FIGS. 6, 8, and 9, when the groove 58 of the base portion 24 extends in the direction PD parallel to the rotation axis S, the position of the cutting insert 14 is less likely to be displaced with respect to the holder 12, and the machining accuracy of the cutting insert 14 can be further improved.

As in the example illustrated in FIGS. 8 and 9, when the edge portion 58*e* on the radially outer side RDe of the groove 58 of the base portion 24 coincides with the edge portion 30*e* on the radially outer side RDe of the first rear surface 30, the thickness of the base portion can be sufficiently secured on the outer peripheral side (radially outer side RDe). Thus, the cutting insert 14 is even less likely to be damaged, and the durability of the cutting insert 14 can be even further enhanced.

As in the example illustrated in FIGS. 8 and 9, when the groove 58 of the base portion 24 is spaced apart from the edge portion 30*i* on the radially inner side RDi of the first rear surface 30, excessive thinning of the portion of the holder 12 on the radially inner side RDi, which supports the cutting insert 14, can be avoided. Thus, the holder 12 is less likely to be damaged, and the durability of the holder 12 can be further improved.

As in the example illustrated in FIGS. 8 and 9, the width W2 of the second portion F2*p* in the radial direction may be larger than the width W1 of the first portion F1*p* in the radial direction. In this case, the maximum value L2max of the width of the second portion F2*p* can easily be maintained great, while an inclination of the second portion F2*p* with respect to the reference plane VP is made gentle. Since the inclination of the second portion F2*p* with respect to the reference plane VP is gentle, the machining load transmitted from the cutting insert 14 to the holder 12 is less likely to be directed to the radially outer side RDe, and the cutting insert 14 is stably held. Since the maximum value L2max of the second portion F2*p* is secured to be great, the scattering of the cutting insert 14 due to the centrifugal force is less likely to occur.

Method for Manufacturing Machined Portion

Figure 10:
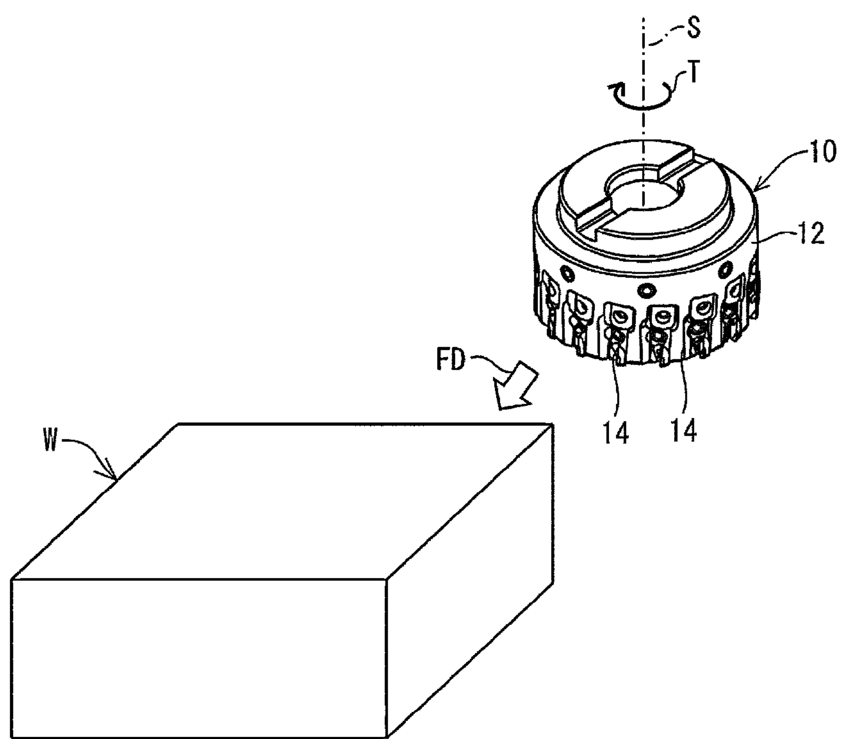
FIG. 10 is a schematic view illustrating a method for manufacturing a machined product according to the embodiment of the present disclosure.
Figure 11:
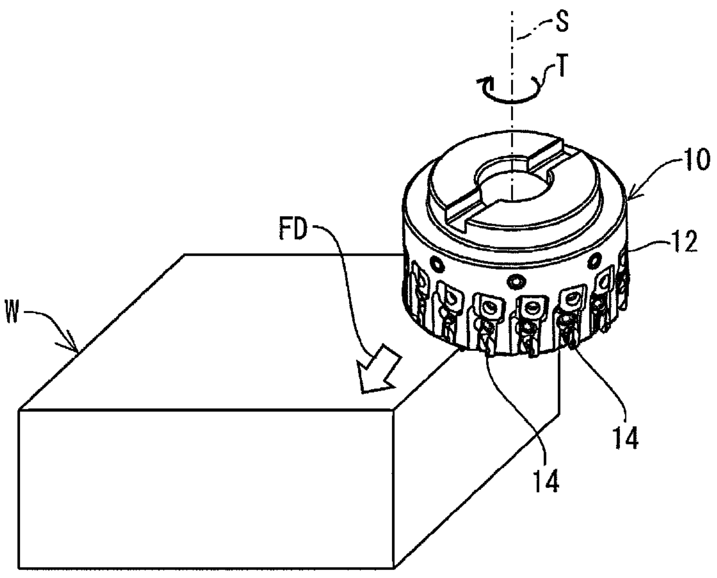
FIG. 11 is a schematic view illustrating the method for manufacturing the machined product according to the embodiment of the present disclosure.
Figure 12:
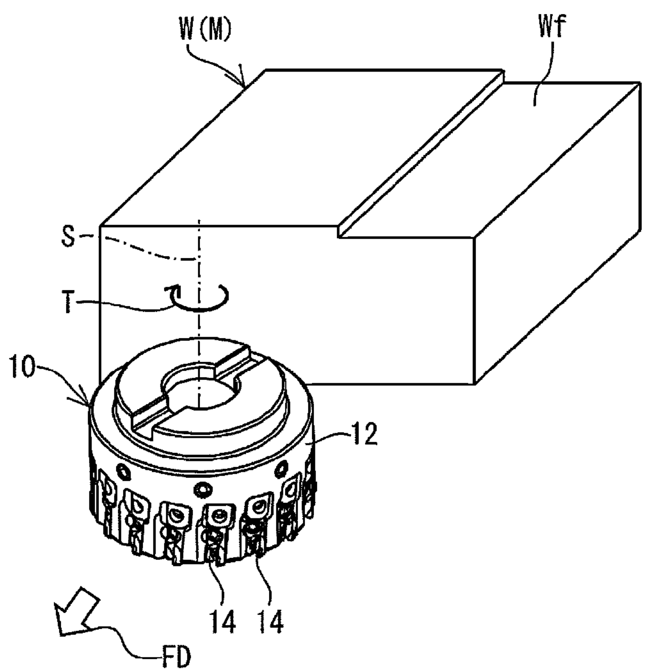
FIG. 12 is a schematic view illustrating the method for manufacturing the machined product according to the embodiment of the present disclosure.

A method for manufacturing a machined product according to the embodiment will be described with reference to FIGS. 10 to 12. FIGS. 10 to 12 are schematic views illustrating the method for manufacturing the machined product according to the embodiment.

As illustrated in FIGS. 10 to 12, the method for manufacturing the machined product according to the embodiment of the present disclosure is a method for manufacturing a machined product M, which is the workpiece W after machined, and includes a first step, a second step, and a third step. The first step is a step of rotating the rotary tool 10. The second step is a step of bringing the rotating rotary tool 10 into contact with the workpiece W. The third step is a step of separating the rotary tool 10 from the workpiece W. Here, examples of the material of the workpiece W include aluminum alloy, stainless steel, carbon steel, alloy steel, cast iron, and non-ferrous metal. The specific content of the method for manufacturing the machined product according to the embodiment is as follows.

As in the example illustrated in FIGS. 10 and 11, the rotary tool 10 is moved toward the workpiece W in the direction of an arrow FD while being rotated in the rotation direction T. The cutting insert 14 of the rotating rotary tool 10 is moved in the direction of the arrow FD while being brought into contact with the workpiece W. Thus, machining (milling processing) of the workpiece W is performed by the rotary tool 10, and a machined surface Wf is formed on the workpiece as in the example illustrated in FIG. 12.

Subsequently, as in the example illustrated in FIG. 12, the rotary tool 10 is moved in the direction of an arrow FD to be separated from the workpiece W. This completes the machining of the workpiece W and allows the machined product M, which is the workpiece W after machined, to be manufactured. Since the rotary tool 10 has excellent cutting capabilities because of the above reasons, the machined product M having an excellent machining accuracy can be manufactured.

When the machining is continued, bringing the cutting insert 14 of the rotary tool 10 into contact with a different portion of the workpiece W may be repeated, while the rotary tool 10 is being rotated. In the present embodiment, although the rotary tool 10 is brought close to the workpiece W, since the rotary tool 10 may be brought relatively close to the workpiece W, the workpiece W may be brought close to the rotary tool 10. In this respect, this is also applicable to separating the rotary tool 10 from the workpiece W.

In the present disclosure, the invention has been described above based on the various drawings and examples. However, the invention according to the present disclosure is not limited to the above-described embodiments. That is, the embodiments of the invention according to the present disclosure can be modified in various ways within the scope illustrated in the present disclosure, and embodiments obtained by appropriately combining the technical means disclosed in different embodiments are also included in the technical scope of the invention according to the present disclosure. In other words, a person skilled in the art can easily make various variations or modifications based on the present disclosure. Note that these variations or modifications are included within the scope of the present disclosure.

REFERENCE SIGNS

10 Rotary tool
12 Holder
14 Cutting insert
16 Pocket
16*a* Bottom surface
16*b* First inner side surface
16*c* Second inner side surface
16*d* Protrusion
18 Fixing screw
20 Adjustment mechanism
22 Fixing screw
24 Base portion
24*a* Main wall portion
24*b* First outer wall portion
24*c* Second outer wall portion
24*d* Rising wall portion
26 Through hole
28 Cutout portion
30 First rear surface
30*e* Edge portion on radially outer side
30*i* Edge portion on radially inner side
32 Recess
34A First front surface
34B Lateral wall surface
34C Rear wall surface
36 First end surface
38 Cutting portion
40 Second rear surface
42 Second front surface
44 Second end surface
46 Outer surface
48 End cutting edge (cutting edge)
50 Outer peripheral cutting edge (outer peripheral blade)
52 Corner portion
54 Chip pocket
56 Injection hole
58 Groove
58*b* Bottom portion

58*e* Edge portion on radially outer side
F1 First region
F1*p* First portion
F2 Second region
F2*p* Second portion

The invention claimed is:

1. A cutting insert for use in a rotary tool rotatable about a rotation axis, the cutting insert comprising:
a base portion comprising:
a first rear surface located rearward in a rotation direction of the rotary tool;
a first front surface located on an outer side in a radial direction and facing forward in the rotation direction; and
a first end surface located on a front end side in a direction along the rotation axis, and being connected to the first rear surface and the first front surface; and
a cutting portion comprising:
a second rear surface that is flat and is bonded to the first front surface;
a second front surface that is flat and is located opposite to the second rear surface;
a second end surface located on the front end side and being connected to the second rear surface and the second front surface; and
a cutting edge located at an intersection of the second front surface and the second end surface, wherein,
when viewed from the front end side,
the first end surface comprises:
a first region located rearward of the second rear surface in the rotation direction and being located to the outer side in the radial direction; and
a second region located rearward of the second front surface in the rotation direction and being located further to an inner side in the radial direction than the first region, and
when a virtual plane including the second rear surface is a reference plane,
the first region comprises a first portion in which a width of a region interposed between the reference plane and the first rear surface gradually increases toward the outer side in the radial direction due to a curved shape of the first rear surface, and
the second region comprises a second portion in which a width of a region interposed between the reference plane and the first rear surface gradually increases toward the inner side in the radial direction.

2. The cutting insert according to claim 1, wherein
a maximum value of the width of the region interposed between the reference plane and the first rear surface in the first region is less than a maximum value of the width of the region interposed between the reference plane and the first rear surface in the second region.

3. The cutting insert according to claim 1- or 2, wherein
a minimum value of the width of the region interposed between the reference plane and the first rear surface in the first region is greater than a minimum value of the width of the region interposed between the reference plane and the first rear surface in the second region.

4. The cutting insert according to claim 1, wherein
the first rear surface comprises a groove extending in a direction along the rotation axis, and
the groove has a curved shape recessed forward in the rotation direction.

5. The cutting insert according to claim 4, wherein
the groove has a bottom portion located most frontward in the rotation direction, and
the bottom portion is located further to the inner side than the cutting portion is in the radial direction.

6. The cutting insert according to claim 4, wherein
the groove extends in a direction parallel to the rotation axis.

7. The cutting insert according to claim 4, wherein
an edge portion of the groove on the outer side in the radial direction coincides with an edge portion of the first rear surface on the outer side in the radial direction.

8. The cutting insert according to claim 4, wherein
the groove is spaced apart from an edge portion on the inner side in the radial direction of the first rear surface.

9. A rotary tool comprising:
a holder having a cylindrical shape extending along the rotation axis from the front end side to a rear end side, and comprising a pocket located to the front end side; and
the cutting insert according to claim 1 and being located in the pocket.

10. A method for manufacturing a machined product, the method comprising:
rotating the rotary tool according to claim 9;
bringing the rotary tool that rotates into contact with a workpiece; and
separating the rotary tool from the workpiece.

* * * * *